United States Patent
Burstein et al.

(10) Patent No.: US 8,185,860 B2
(45) Date of Patent: May 22, 2012

(54) METHOD FOR MATCHING TIMING ON HIGH FANOUT SIGNAL PATHS USING ROUTING GUIDES

(75) Inventors: Michael Burstein, Cupertino, CA (US); Boris Ginzburg, Santa Clara, CA (US); Andrew Nikishin, Moscow (RU)

(73) Assignee: Golden Gate Technology, Inc., San Jose, CA (US)

( * ) Notice: Subject to any disclaimer, the term of this patent is extended or adjusted under 35 U.S.C. 154(b) by 0 days.

(21) Appl. No.: 13/206,449

(22) Filed: Aug. 9, 2011

(65) Prior Publication Data

US 2011/0291769 A1 Dec. 1, 2011

Related U.S. Application Data

(62) Division of application No. 10/946,926, filed on Sep. 21, 2004, now Pat. No. 8,015,533.

(51) Int. Cl.
*G06F 17/50* (2006.01)
(52) U.S. Cl. .................. 716/126; 716/129; 716/130
(58) Field of Classification Search .................. 716/126, 716/129, 130, 134
See application file for complete search history.

(56) References Cited

U.S. PATENT DOCUMENTS

| | | | | |
|---|---|---|---|---|
| 5,521,837 A | * | 5/1996 | Frankle et al. | 716/113 |
| 6,229,861 B1 | * | 5/2001 | Young | 375/356 |
| 6,594,807 B1 | * | 7/2003 | Tetelbaum et al. | 716/114 |
| 6,725,438 B2 | * | 4/2004 | van Ginneken | 716/113 |
| 6,817,005 B2 | * | 11/2004 | Mason et al. | 716/116 |
| 7,765,443 B1 | * | 7/2010 | Syed et al. | 714/724 |

\* cited by examiner

*Primary Examiner* — Vuthe Siek
(74) *Attorney, Agent, or Firm* — The Law Offices of Andrew D. Fortney; Andrew D. Fortney

(57) ABSTRACT

A method, algorithm, software, architecture and/or system for routing signal paths or connections between circuit blocks in a circuit design is disclosed. In one embodiment, a method of routing can include: (i) determining a signal path between at least three circuit blocks; (ii) placing a routing guide; and (iii) routing the signal path through the routing guide such that a timing of a signal along the signal path at two or more the circuit blocks is substantially matched. The circuit blocks can include standard cells configured to implement a logic or timing function, other components, and/or integrated circuits, for example. The routing guide can include a splitter configured to branch the signal path into at least two associated segments. Embodiments of the present invention can advantageously improve signal timing for high fanout signal paths between circuit blocks in an automated place-and-route flow.

18 Claims, 5 Drawing Sheets

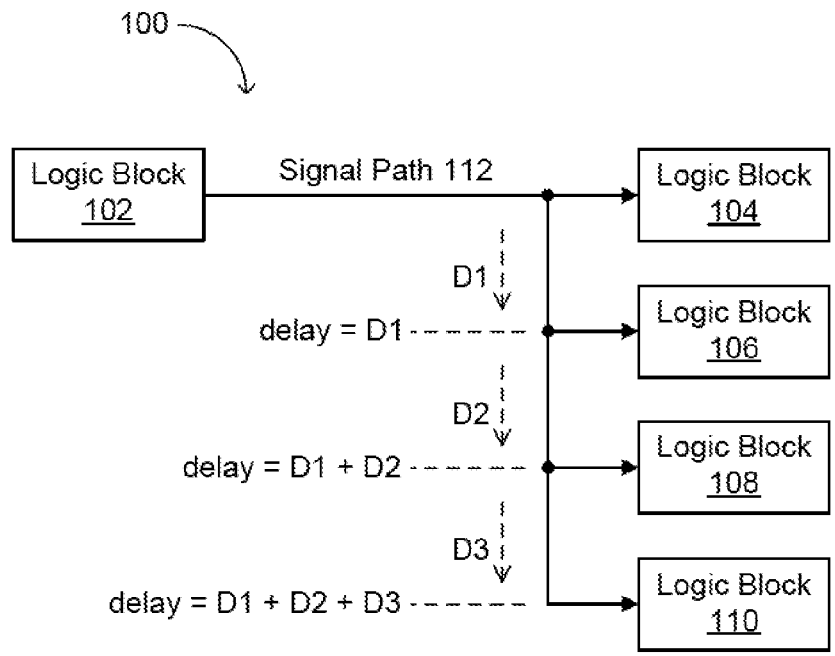
FIG. 1 (conventional)

METHOD FOR MATCHING TIMING ON HIGH FANOUT SIGNAL PATHS USING ROUTING GUIDES

RELATED APPLICATIONS

This application is a divisional application of U.S. patent application Ser. No. 10/946,926, filed Sep. 21, 2004, now U.S. Pat. No. 8,015,533, which is incorporated herein by reference in its entirety.

FIELD OF THE INVENTION

The present invention generally relates to the field of circuit design, particularly integrated circuit (IC) design. More specifically, embodiments of the present invention pertain to methods, algorithms, software, systems and architectures for improving signal timing in the design of an IC.

DISCUSSION OF THE BACKGROUND

In typical circuit design, circuit components are arranged to optimize space and/or circuit performance. Such arrangements can include the "layout" or pattern definition of each of the layers used in a semiconductor manufacturing process. For example, such layout can include metal interconnect or connectivity layers that are converted to masks or reticles for use in a wafer fabrication facility that manufactures ICs (i.e., "chips").

While some circuits are designed using "custom" layout, others are designed using a partially or fully automated design flow. Application-Specific Integrated Circuit (ASIC) designs, as well as other functional blocks within a larger chip, such as System-On-Chip (SOC) designs, may employ custom and/or ASIC type flows on the same chip. In any event, typical ASIC flows use "place-and-route" tools for placing logic or circuit "blocks" and then "routing" or connecting the interface signals between the blocks. Such routing between circuit blocks is typically done using one or more metal connectivity layers.

Referring now to FIG. 1, a box diagram showing a conventional routing for a high fanout signal path is indicated by the general reference character 100. Logic Block 102 is connected to Logic Blocks 104, 106, 108, and 110 via a signal path 112. Such a multiple load and/or connection signal path may be considered a "high fanout" signal path for automated routing purposes. As shown, timing delays due to unmatched signal path routing can result in a delay D1 between Logic Blocks 104 and 106, a delay D1+D2 between Logic Blocks 104 and 108, and a delay D1+D2+D3 between Logic Blocks 104 and 110. Among the conventional approaches to address this timing disparity are: (i) the insertion of buffer stages; (ii) custom-routing high fanout signals; and/or (iii) adjusting block placements in order to obtain more favorable signal routing.

However, such conventional approaches to high fanout signal path routing are not desirable in an automated place-and-route flow. Inserting extra buffer stages merely for signal path routing facilitation takes chip layout area away from other functional circuit blocks and may increase a signal delay. Custom-routing high fanout signals can be a time consuming process that essentially defeats at least part of the purpose of an automated place-and-route flow. Similarly, adjusting block placements in order to assist high fanout signal routing may also be a time consuming process that does not effectively comport with an automated flow. Accordingly, signal path routing using conventional approaches may not improve high fanout signal path timing characteristics in an efficient manner.

Given the increasing demands on circuit designers to create chips of increasing density, decreasing wire and transistor widths, and decreasing power supply and power consumption, it is difficult to ensure optimal high fanout signal path timing in an automated place-and-route flow. Increasing the complexity, flexibility and/or functionality of the circuitry on a chip exacerbates these challenges. Thus, what is needed is a tool with which integrated circuit designers can efficiently optimize high fanout signal path routing and/or timing in an automated place-and-route flow.

SUMMARY OF THE INVENTION

Embodiments of the present invention relate to methods, algorithms, software, architectures and/or systems for routing signals or wires between circuit blocks in a circuit design.

In one embodiment, a method of routing can include: (i) determining a signal path between at least three circuit blocks; (ii) placing a routing guide; and (iii) routing the signal path through the routing guide such that a timing of a signal along the signal path at two or more of the circuit blocks is substantially matched. The circuit blocks can include standard cells configured to implement a logic or timing function, other components, and/or integrated circuits, for example. The routing guide can include a splitter configured to branch the signal path into at least two associated segments.

Embodiments of the present invention can advantageously improve signal timing for high fanout signal paths between circuit blocks in an automated place-and-route flow. Embodiments of the present invention are suitable for the automated routing of signal paths between circuit blocks within an integrated circuit (IC) and/or routing between ICs or components on a board, such as a printed circuit board (PCB).

These and other advantages of the present invention will become readily apparent from the detailed description of preferred embodiments below.

BRIEF DESCRIPTION OF THE DRAWINGS

FIG. 1 is a box diagram showing a conventional routing for a high fanout signal path.

DETAILED DESCRIPTION OF THE PREFERRED EMBODIMENTS

Figure 2A:
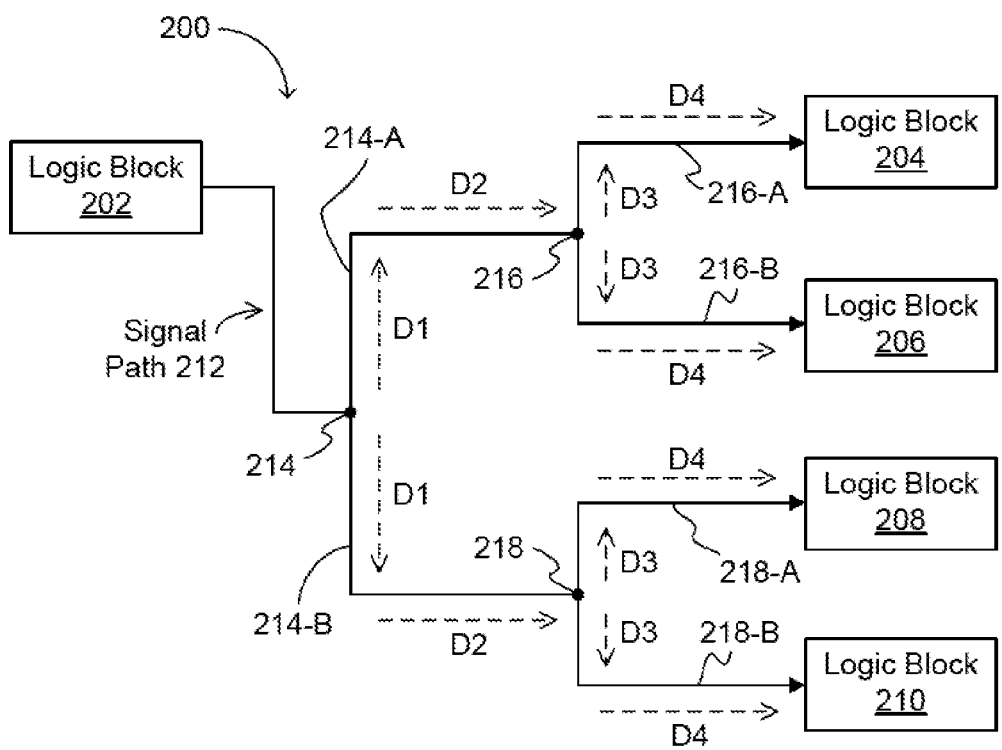
FIG. 2A is a box diagram showing a high fanout signal path routing according to an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, in the context of this application, the terms "net list" (or "netlist") and "hardware description" may be used interchangeably to refer to a circuit design represented in an appropriate language, such as VERILOG simulation language, Hardware Description Language (HDL) or VERILOG HDL (VHDL; VERILOG is a registered trademark of Gateway Design Automation Corporation for computer aided electrical engineering programs). Similarly, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may (a) the terms "flip-flop," "latch" and "register," and (b) the terms "connected to," "coupled with," "coupled to," and "in communication with," but these terms are generally given their art-recognized meanings herein.

The present invention concerns a method and/or algorithm (e.g., a computer-readable set of instructions) for routing signal paths or connections between circuit blocks, and can include: (i) determining a signal path between at least three circuit blocks; (ii) placing a routing guide; and (iii) routing the signal path through the routing guide such that a timing of a signal along the signal path at two or more of the circuit blocks is substantially matched. The circuit blocks can include standard cells configured to implement a logic or timing function, other components, and/or integrated circuits, for example. The routing guide can include a splitter configured to branch the signal path into at least two associated segments.

In a further aspect of the invention, software relates to a medium or waveform containing a computer-readable set of instructions, where the instructions can be adapted to perform a method including: (i) determining a signal path between at least three circuit blocks; (ii) placing a routing guide; and (iii) routing the signal path through the routing guide such that a timing of a signal along the signal path at two or more of the circuit blocks is substantially matched.

In another aspect of the invention, a method and/or algorithm of connecting can include: (i) determining a plurality of signal paths interfacing circuit blocks; (ii) determining whether any of the plurality of signal paths are high fanout signal paths; (iii) placing a routing guide for an identified high fanout signal path; and (iv) routing the identified high fanout signal path through the routing guide such that a timing of a signal along the signal path at two or more of the circuit blocks is substantially matched.

In another aspect of the invention, a connection of circuit blocks can include: (i) at least first, second and third circuit blocks; (ii) a routing guide; and (iii) a signal path having at least first, second and third segments having first terminals respectively coupled to the first, second and third circuit blocks and second terminals coupled to the routing guide, such that a timing of a signal along first and second segments of the signal path substantially matches the timing of the signal along first and third segments of the signal path.

Embodiments of the present invention can advantageously improve signal timing for high fanout signal paths between circuit blocks in an automated or semi-automated place-and-route flow. Embodiments of the present invention are suitable for the automated routing of signal paths between circuit blocks within an integrated circuit (IC) and/or routing between ICs or components on a board, such as a printed circuit board (PCB).

The invention further relates to hardware and/or software implementations of the present architecture, method and system. The invention, in its various aspects, will be explained in greater detail below with regard to exemplary embodiments.

Referring now to FIG. 2A, a box diagram showing a high fanout signal path routing according to an embodiment of the present invention is indicated by the general reference character 200. Logic Block 202 can interface to Logic Blocks 204, 206, 208, and 210 via signal or "signal path" 212. Signal path 212 can include routing guides 214, 216, and 218, as well as segments 214-A, 214-B, 216-A, 216-B, 218-A, and 218-B. A "routing guide" can be any marker or indicator other than a circuit block port or routing termination point that is used to guide the physical routing of a signal path. For example, a routing guide can be a splitter configured to branch the signal path into at least two associated segments (e.g., segments 216-A and 216-B may be "associated" with routing guide 216) or a delay indicator configured to add delay or signal path length to the routed signal. Such additional signal path delay and/or length for a delay indicator may include sufficient signal path routing length so as to substantially match a signal path delay in another signal path, for example. Routing guide 214 is a splitter type so that signal path 212 can be segmented into two segments 214-A and 214-B, as shown. Further, such segments can each include two terminals. For example, segment 214-A can include a terminal at splitter 214 and another terminal at splitter 216. Splitter 216 can also be used to segment signal path 212 further for connections to Logic Blocks 204 and 206 by way of segments 216-A and 216-B, respectively. Similarly, splitter 218 can be used to segment signal path 212 further for connections to Logic Blocks 208 and 210 by way of segments 218-A and 218-B, respectively, as shown. Due to the use of splitters 214, 216, and 218, each of Logic Blocks 204, 206, 208, and 210 can see a substantially matched timing delay of D1+D2+D3+D4, as indicated.

Once the routing of signal path 212 is completed (e.g., in an automated routing flow), splitters 214, 216, and 218 can be removed. As such, routing guides can be "sacrificial" structures. Accordingly, any suitable marker or indicator can be used. Other examples of routing guides include any designated sacrificial circuit or element having at least one input and one output (e.g., a delay indicator), a similar structure having one input and two or more outputs (e.g., a splitter), or vice versa. Because the routing guides can be removed after the signal path routing, any conceivable structure configured to guide the routing of a signal path can be used as a routing guide.

In this fashion, a signal path can be routed between circuit or logic blocks, or other routing termination points (e.g., ports or other designations for subsequent signal connections, as in hierarchical layout block arrangements), through a routing guide, such as a splitter. Accordingly, such routing guides can be used to substantially match or otherwise affect the timing of high fanout signals, as measured at a plurality of the circuit block connections. Also, a particularly advantageous application for embodiments of the present invention involves routing clock signals or other signals having a high number of connection points.

Figure 2B:
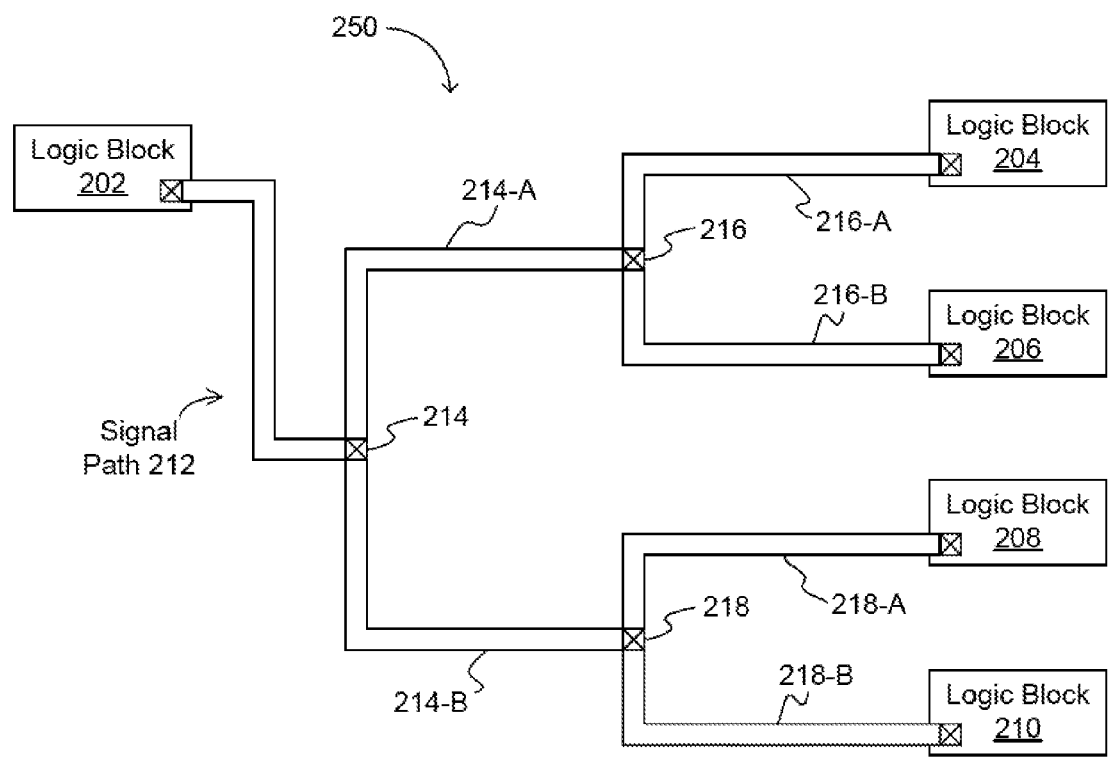
FIG. 2B is a box diagram showing a simplified layout view of the signal path routing for the circuit of FIG. 2A resulting from the use of embodiments of the present invention.

Referring now to FIG. 2B, a box diagram showing a simplified layout view of the signal path routing for the circuit of FIG. 2A resulting from the use of embodiments of the present invention is indicated by the general reference character 250. Signal path 212 may be routed in a particular connectivity layer, such as metal-2 (M2) or metal-3 (M3), or a combination of several layers. Splitter 214 may have a physical layout representation, such as a via layer (e.g., via-2 (V2)) or a designated unused layer (i.e., a layer not necessarily corresponding to or used in a wafer processing step). As shown, the routing for signal path 212 from Logic Block 202 may be split or may "branch" into two segments (e.g., segments 214-A and 214-B) by splitter 214. Further, such segments can each include two terminals. For example, segment 214-A can include a terminal at splitter 214 and another terminal at splitter 216. The routing for signal path 212 may be further split into segments 216-A and 216-B by splitter 216 for connections to Logic Blocks 204 and 206, respectively. Similarly, routing for signal path 212 may be split into segments 218-A and 218-B by splitter 218 for connections to Logic Blocks 208 and 210, respectively.

Figure 2C:
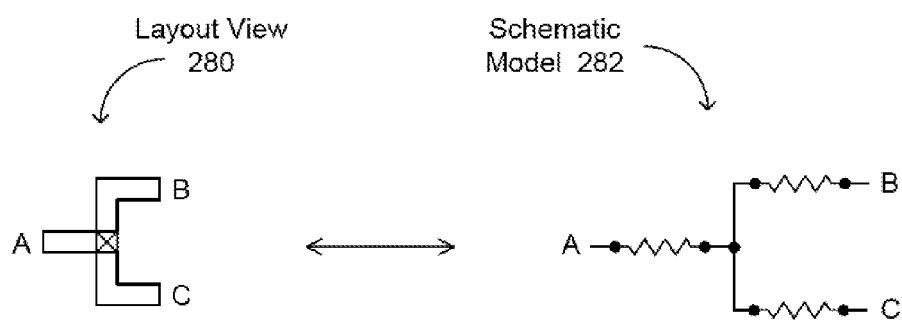
FIG. 2C is a diagram showing layout and schematic views of a routing guide according to an embodiment of the present invention.

Referring now to FIG. 2C, a diagram showing layout and schematic views of a routing guide according to an embodiment of the present invention is indicated by general reference characters 280 and 282, respectively. Layout view 280 shows a routing for a signal path with ports A, B, and C. Such "ports" may be routing termination points, which may include any designations for subsequent signal connections, as intended for hierarchical layout block arrangements, for example. The routing includes a branch due to the splitter type routing guide, as shown. The "branching" or "splitting" can occur prior to or coincident with a placement of the splitter whereby a "net" is split into new nets and the associated connectivity is updated. A corresponding schematic model 282 may include a resistor on each branch of the signal routing. Alternatively, a schematic model may include only a single resistor with two ports. In any event, the routing guides are typically "sacrificial," so the routing guides can be, and generally are, removed after signal path routing. In a particular automated flow, the routing guides can be removed after place-and-route, simulation, and/or timing optimization are completed. Such removing can be done with a "collapse all nets" type command.

Figure 3:
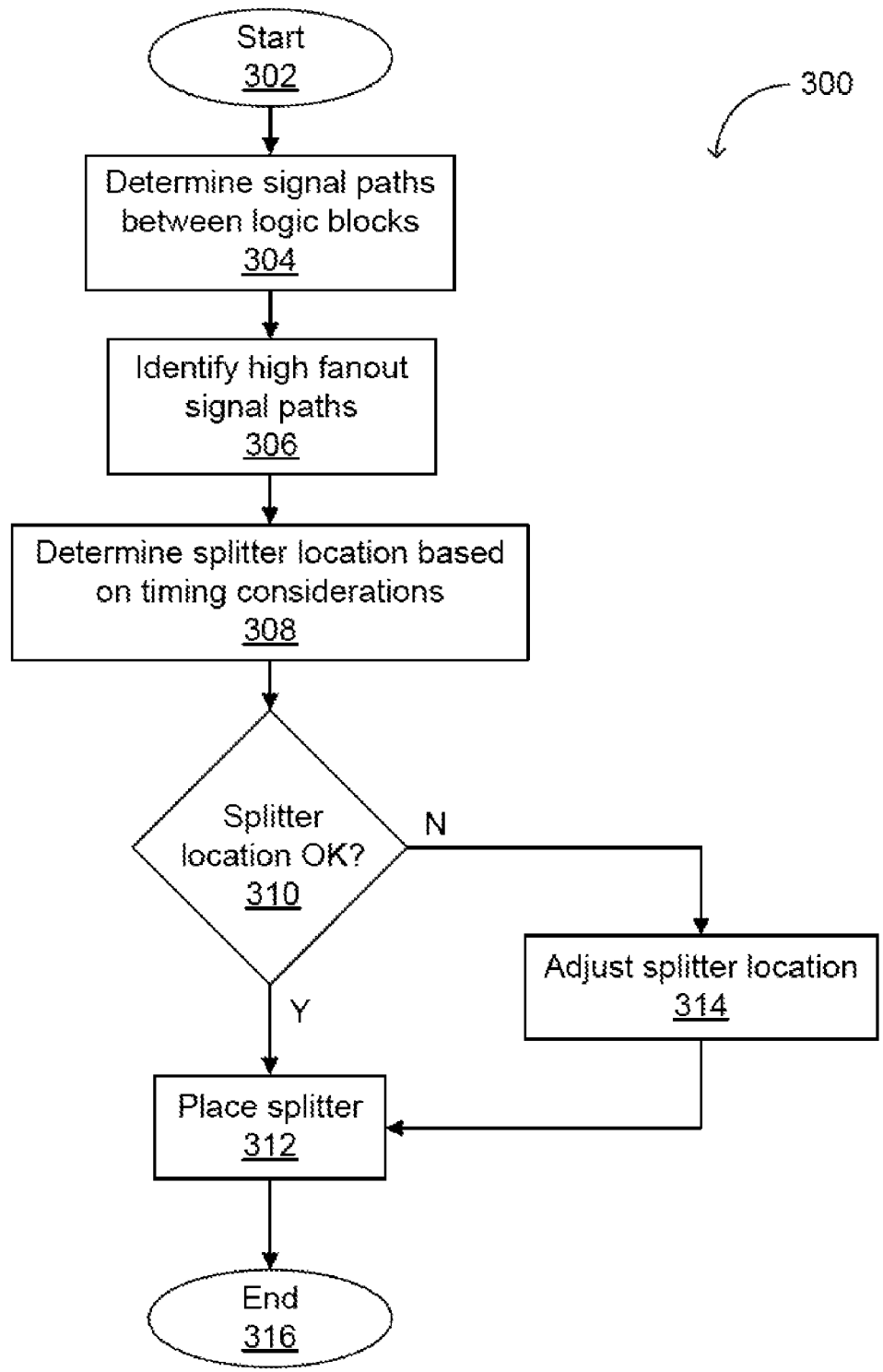
FIG. 3 is a flow diagram showing a routing guide placement method according to an embodiment of the present invention.

Referring now to FIG. 3, a flow diagram showing a routing guide placement method according to an embodiment of the present invention is indicated by the general reference character 300. The flow can begin in Start 302 and signal paths between logic blocks or the like can be determined (304). Of course, any appropriate signal path suitable for automated routing can be determined. Such a determination of an "interface" or signal path between logic blocks can be made by reference to a "netlist" file. Netlist files can be generated, for example, by a synthesizer based on a Hardware Description Language (HDL) representation of the logic functions of a circuit (which generally includes the logic blocks of the circuit), as will be discussed in more detail below with reference to FIG. 5.

In FIG. 3, the flow can continue with the identification of high fanout signal paths, such as clock signal paths (306). For example, signals or "nets" with at least three, four, or five connections to circuit blocks may be parsed from the netlist and identified as high fanout type signals. Splitters or other types of routing guides may be placed on such identified high fanout signal paths (308). The placement of routing guides can be performed automatically by an automatic placer and/or clock tree synthesis tool. Alternatively, routing guide placement can be done in an interactive or "manual" fashion. Typically, an initial routing guide (e.g., splitter) placement can be determined by timing considerations (e.g., by using a timing closure or clock tree synthesis tool). Such considerations may include results of timing checks as measured or otherwise determined at two or more of the circuit block connections. In this fashion, a timing, such as a signal path delay, can be substantially matched at the circuit blocks. Thus, the method may further include the step of checking the timing of the signal along the signal path, and placing the routing guide in a manner facilitating and/or enabling substantial matching of the timing. For example, the routing guide may be placed in a location enabling routing of signal path segments of substantially equal length between the routing guide (e.g., routing guides 214 and/or 216/218 in FIG. 2B) and circuit blocks receiving the signal (e.g., logic blocks 204-210) and/or other routing guides (e.g., routing guides 216/218).

Once an initial splitter placement determination is made, that initial placement can be checked to ensure that it does not violate any routing restrictions (310). Such routing restrictions may include areas obstructed for routing, areas blocked off for placement and/or routing, or proximity too close to such areas. If the initial placement determination is acceptable (i.e., not subject to routing "restrictions"), the splitter can be placed (312) and the flow can complete in End 316. If however, the initial placement determination is subject to a routing restriction, the splitter location can be adjusted (314) prior to the placement (312). The adjusting of the splitter location can include automatically determining a closest placement not subject to routing restrictions. Alternatively, a manual or interactive re-placement of the splitter can be employed. In this fashion, a routing guide can be placed so as to allow a signal path routing through the routing guide in order to substantially match a timing at two or more circuits or routing terminations.

Figure 4A:
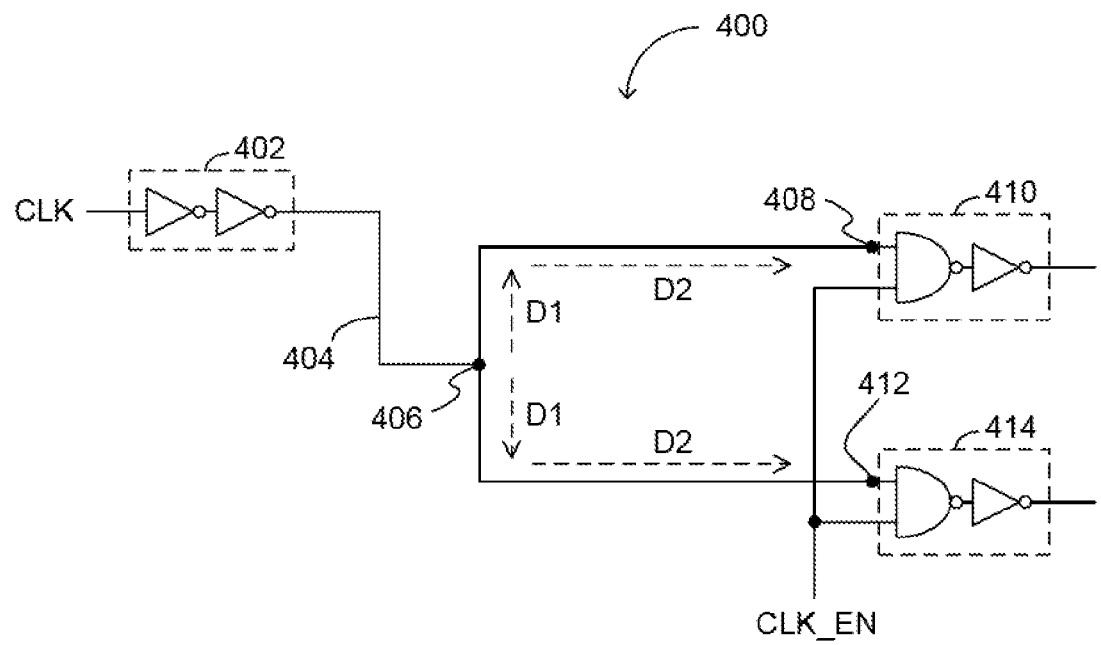
FIG. 4A is a schematic diagram showing an exemplary circuit that may be used to demonstrate the present invention.

Referring now to FIG. 4A, a schematic diagram showing an exemplary circuit that may be used to demonstrate the present invention is indicated by the general reference character 400. This example shows a simple circuit structure using standard cells or gates to implement logic or other functions that is suitable for IC design. Such logic functions could include AND/NAND, OR/NOR, XOR/XNOR, INV, or flip-flops, as just a few examples. In practice, any circuit can be designed and treated as a "standard cell" for automatic placement and routing in a larger design. More commonly, a set of standard cells are provided and characterized for each design technology and are utilized in an "off-the-shelf" manner in a typical ASIC design flow.

In the example of FIG. 4A, standard cell 402 can be a buffer stage receiving input CLK and outputting signal 404 for a connection to a plurality of other standard cells (e.g., standard cells 410 and 414). Standard cells 410 and 414 can be "AND" type functions, each having a NAND-gate followed by an inverter. Standard cell 410 can receive signal 404 at input connection 408 as well as CLK_EN at the other NAND-gate input. Standard cell 414 can similarly receive signal 404 at input 412 as well as CLK_EN, for example. Embodiments of the present invention can be used to optimize a timing or substantially match a timing delay to different circuit block locations. Consistent with such embodiments, signal path splitter 406 can be placed to guide the routing of signal path 404. Further, a simulation of circuit 400 can be done to verify and/or further optimize any critical circuit timings.

Figure 4B:
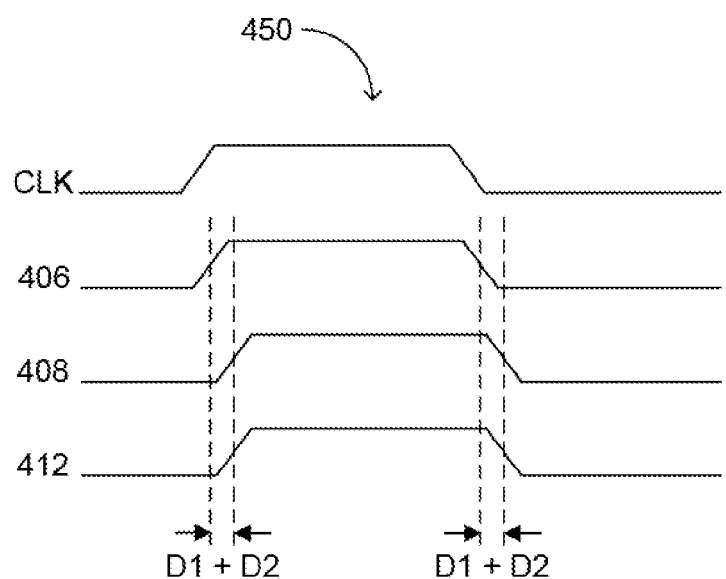
FIG. 4B is an exemplary timing diagram for the circuit of FIG. 4A.

Referring now to FIG. 4B, an exemplary timing diagram for the circuit of FIG. 4A is shown and indicated by the general reference character 450. Such a timing diagram can be a waveform representation of a VERILOG simulation result, such as a Value Change Data (VCD) file, for example. Alternatively, another simulator, such as a SPICE-based simulator, may be used to obtain more detailed timing results. In FIG. 4B, the waveforms are shown and labeled per their corresponding circuit "probes" in the circuit of FIG. 4A. Clock signal CLK can be any type of oscillating signal and may go high (i.e., transition from "0" to "1") and go low (i.e., transition from "1" to "0") in alternating cycles. Waveform 406, the output of a standard cell buffer stage, may be a slight delay of CLK. Waveform 408 can be a further delayed version of waveform 406 to reflect signal path and/or associated segment routing delay (e.g., D1+D2), as measured at signal transition midpoints, for example. Similarly, waveform 412 can be a delayed version of waveform 406 to reflect a signal path and/or associated segment routing delay (e.g., D1+D2), as also measured at signal transition midpoints. As indicated in FIGS. 4A and 4B, a timing of a signal may be substantially matched (i.e., both see a delay of D1+D2) by the use of routing guides according to embodiments of the present invention.

Of course, as one skilled in the art will recognize, embodiments of the present invention are also applicable to analog, ternary, or other non-digital circuits. As one example, "small-signal" circuits, either alone or embedded within a larger chip or PCB may employ embodiments of the present invention. In general, embodiments of the present invention can be used in the routing of signal paths between circuit blocks or other routing termination points having interface signals that change states. Further, such state changes suitable for a "matched timing" determination may be of any type (e.g., analog, digital, etc.) recognizable by the interfacing or surrounding circuitry.

In this fashion, timing or other circuit performance "mismatches" due to signal path routing can be reduced or minimized according to embodiments of the present invention.

While the exemplary circuit block arrangements discussed above generally show the routing of signal paths between circuit blocks, these illustrations should not be considered limiting. As one skilled in the art will recognize, such routing may be accomplished between any three or more designated points and embodiments of the present invention are equally adaptable to such applications.

Figure 5:
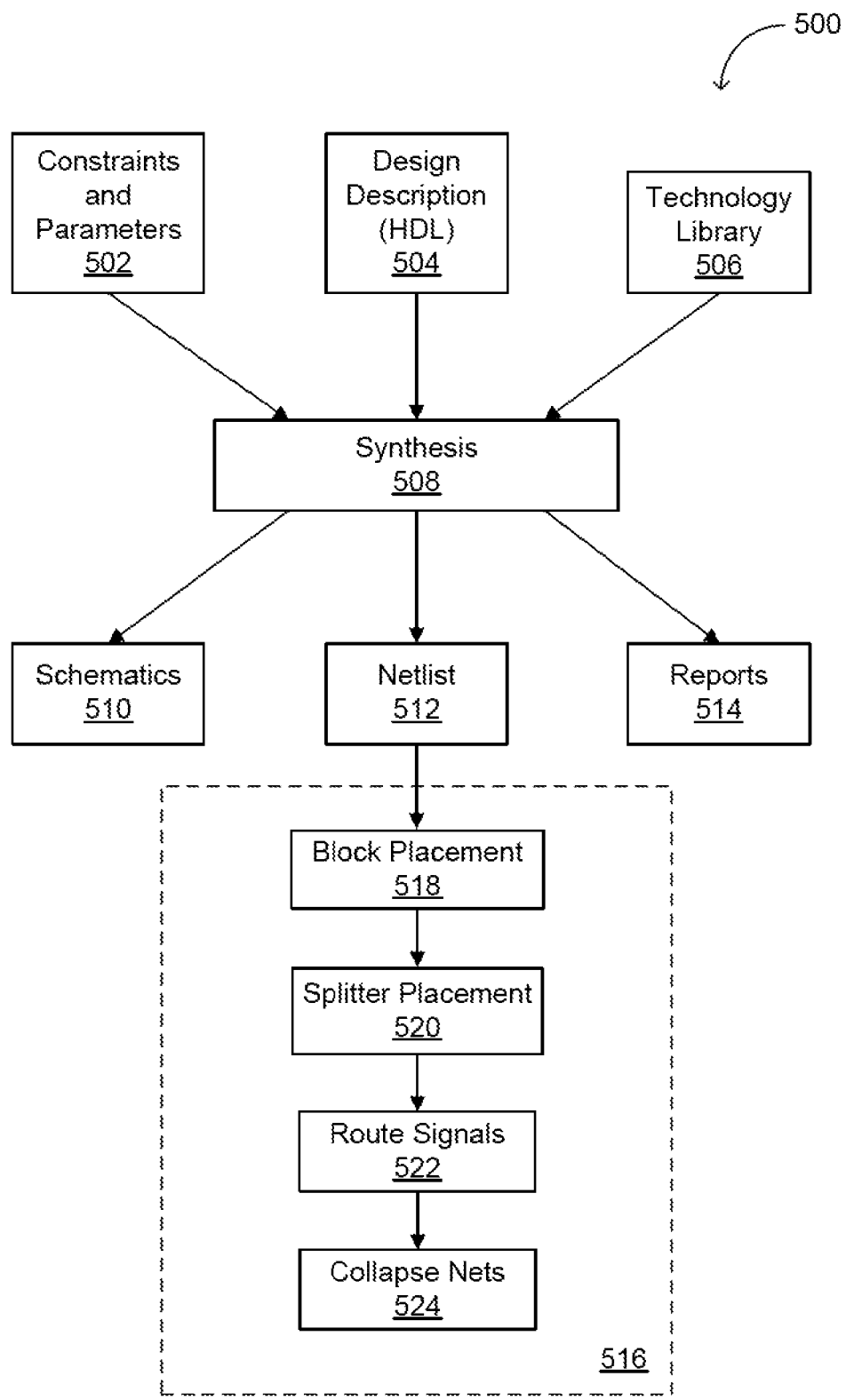
FIG. 5 is a box diagram showing a synthesis flow adapted for use with embodiments of the present invention.

Referring now to FIG. 5, a box diagram showing a synthesis flow adapted for use with embodiments of the present invention is indicated by the general reference character 500.

Box 516 shows elements adapted for use in accordance with embodiments of the present invention. The remaining boxes in FIG. 5 represent a conventional synthesis flow. Inputs to Synthesis 508 typically include Constraints and Parameters 502, Design Description (HDL) 504, and Technology Library 506. Constraints and Parameters 502 may include physical expectations of the design, such as the circuit operating speed and/or the circuit layout area. Design Description (HDL) 504 can be a VERILOG HDL (VHDL) description of the logic operation(s) for synthesis. Technology Library 506 may contain a functional description as well as other information, such as may be related to the area and speed of all standard cells in a given process technology. For example, Technology Library 506 may be specific to a technology generation (e.g., 0.13 micron technology), a company (e.g., TSMC), and a process type (e.g., CMOS; eight-level metal; fast/normal/slow lot variation).

Outputs from Synthesis 508 may include Schematics 510, Netlist 512, and Reports 514. Schematics 510 can be schematic representations of the synthesized functions of Design Description (HDL) 504. Netlist 512 can be a text file description of a physical connection of components, such as standard cells, and can include a description of the various circuit blocks in the design and signal paths between the circuit blocks. Reports 514 can include speed and area data associated with results of Synthesis 508.

As discussed above, a netlist representation (e.g., Netlist 512) may be used for circuit block placement and signal path determination. Accordingly, Block Placement 518 can receive Netlist 512 and provide input to Splitter Placement 520. For example, information about the location of circuit blocks coupled to high fanout signal paths can be included in the input to Splitter Placement 520. Of course, as one skilled in the art will recognize, Block Placement 518 and Splitter Placement 520 can substantially occur in the same automated step, such as by using an automated placement tool. Route Signals 522 can receive information for route signal guidance from Splitter Placement 520 so as to make optimized signal path routes based on the positions of the splitters. Finally, Collapse Nets 524 can include removal of all routing guides.

In this fashion, a conventional ASIC type design flow including synthesis can be adapted for routing of signal paths between standard cells in accordance with embodiments of the present invention.

Further examples of suitable systems, tools and/or methods in which the present invention is generally applicable include those described in, e.g., U.S. Pat. Nos. 6,080,201 and 5,798,936, the relevant portions of which are each incorporated herein by reference, and those commercially available from place-and-route software vendors such as Cadence Design Systems (e.g., the SILICON ENSEMBLE™, SILICON ENSEMBLE-PKS™, FIRST ENCOUNTER™, and NANO ENCOUNTER™ tools), Silicon Valley Research, Inc. (e.g., the QIC/APR™, GARDS™, SC™ and FLOORPLACER™ tools), Synopsys (e.g., the CHIP ARCHITECT™, DESIGN COMPILER™, and FLOORPLAN COMPILER™ tools) and Mentor Graphics (e.g., the AUTOCELLS™ tool).

Thus, embodiments of the present invention can advantageously improve signal timing for high fanout signal paths between circuit blocks in an automated place-and-route flow. Embodiments of the present invention are suitable for the automated routing of signal paths between circuit blocks within an integrated circuit (IC) and/or routing between ICs or components on a board, such as a printed circuit board (PCB).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A connection of circuit blocks, comprising:
   a) at least first, second and third circuit blocks;
   b) a splitter having one input and first and second outputs; and
   c) a signal path having at least first, second and third segments having (i) first terminals respectively coupled to said first, second and third circuit blocks and (ii) second terminals coupled to said splitter, the splitter having a position such that a timing of a signal along first and second segments of said signal path substantially matches a timing of said signal along first and third segments of said signal path.

2. The connection of claim 1, wherein at least one of said at least three circuit blocks includes a standard cell configured to implement a logic or timing function.

3. The connection of claim 2, wherein said logic function comprises an AND, NAND, OR, NOR, XOR, XNOR, or INV gate.

4. The connection of claim 2, wherein said standard cell comprises flip-flops and/or receives a clock signal.

5. The connection of claim 1, wherein at least one of said at least three circuit blocks includes a routing termination.

6. The connection of claim 1, wherein said splitter is configured to indicate a branch of said signal path into at least two of said at least three segments.

7. The connection of claim 1, wherein each of said circuit blocks includes an integrated circuit or component.

8. The connection of claim 1, wherein said splitter includes a layer in a physical layout representation.

9. The connection of claim 8, wherein said layer includes a via or a via layer.

10. The connection of claim 8, wherein said layer includes a designated unused layer.

11. The connection of claim 10, wherein said designated unused layer comprises a layer not used in a wafer processing step.

12. The connection of claim 1, wherein said timing includes a delay of said signal path.

13. The connection of claim 1, wherein said splitter comprises a sacrificial structure.

14. The connection of claim 1, wherein each of said plurality of circuit blocks includes a standard cell configured to implement a logic function.

15. The connection of claim 1, further comprising a fourth circuit block and a second splitter, wherein said signal path further includes fourth and fifth segments electrically connecting the fourth circuit block and the second splitter to at least the first circuit block and the first splitter, the first and second splitters having positions such that a timing of a signal from the first circuit block to the second circuit block substantially matches a timing of said signal from the first circuit block to the third circuit block and from the first circuit block to the fourth circuit block.

16. The connection of claim 15, further comprising a fifth circuit block and a third splitter, wherein said signal path has sixth and seventh segments electrically connecting the fifth circuit block and the third splitter to the first circuit block and one of the first and second splitters, the third splitter having a position such that a timing of a signal from the first circuit block to the fifth circuit block substantially matches the timing of said signal from the first circuit block to the second, third and fourth circuit blocks.

17. The connection of claim 1, comprising n circuit blocks, n−2 splitters and 2n−3 segments, wherein n is an integer of at least 5.

18. The connection of claim 17, wherein said signal path electrically connects the first circuit block to each of the remaining n−1 circuit blocks, and the n−2 splitters each have a position such that a timing of a signal from the first circuit block to each of the remaining n−1 circuit blocks substantially matches.

* * * * *